Jan. 2, 1968  C. J. BADEWITZ  3,362,024
VERTICALITY, ALTITUDE AND VELOCITY SENSING RADAR
Filed Jan. 10, 1966  2 Sheets-Sheet 1
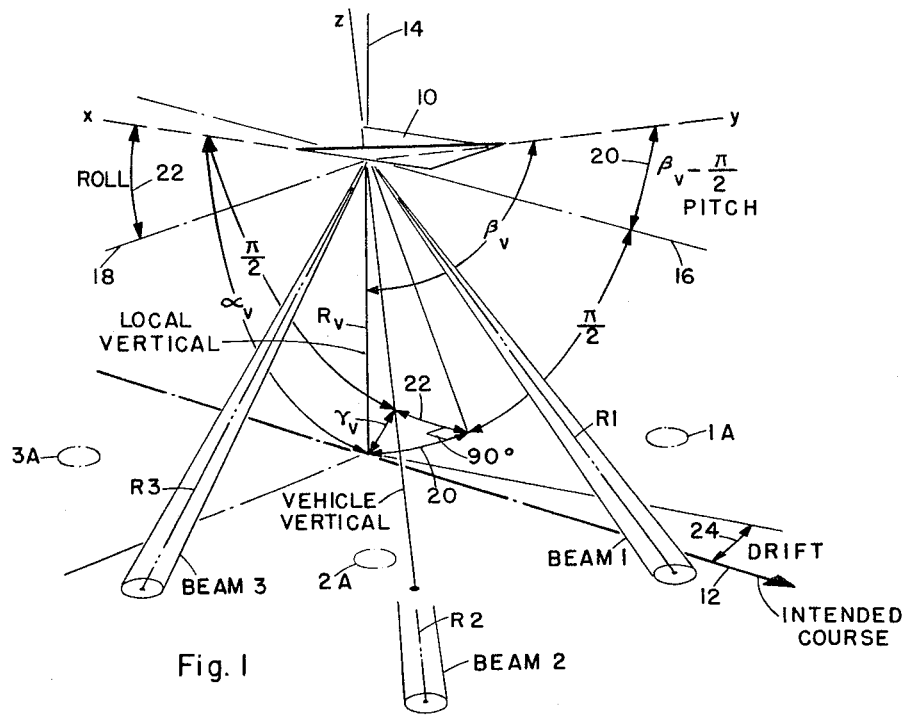
Fig. 1
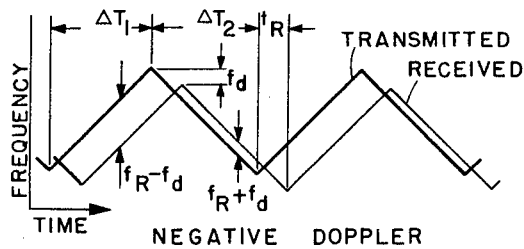
Fig. 2  NEGATIVE DOPPLER
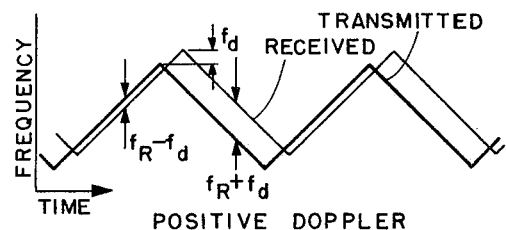
Fig. 3  POSITIVE DOPPLER
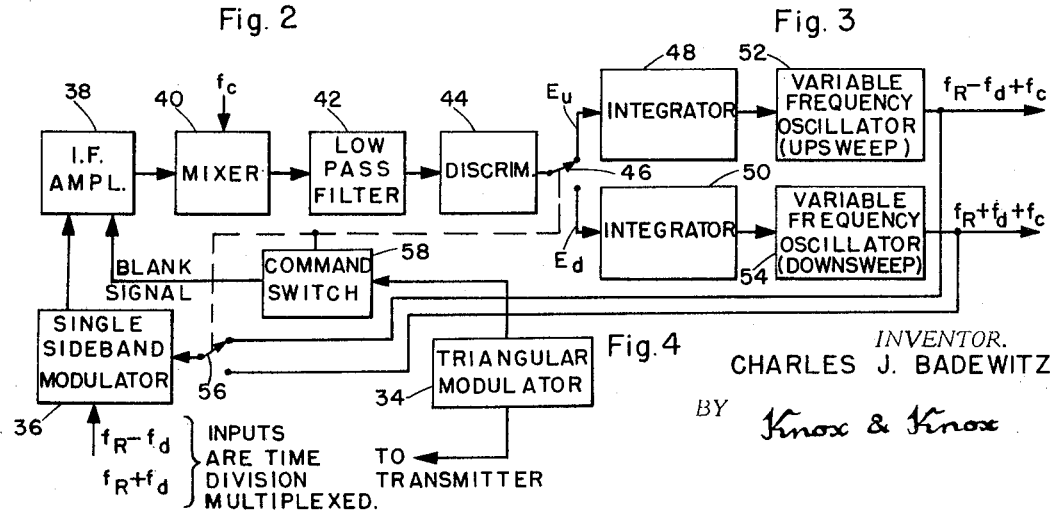
Fig. 4
INVENTOR.
CHARLES J. BADEWITZ
BY Knox & Knox INVENTOR.
CHARLES J. BADEWITZ
BY Knox & Knox

United States Patent Office 3,362,024
Patented Jan. 2, 1968

3,362,024
VERTICALITY, ALTITUDE AND VELOCITY SENSING RADAR
Charles J. Badewitz, San Diego, Calif., assignor to The Ryan Aeronautical Co., San Diego, Calif.
Filed Jan. 10, 1966, Ser. No. 519,755
5 Claims. (Cl. 343—7)

ABSTRACT OF THE DISCLOSURE

Using a multiple beam radar with cyclic modulation of the signal, the system compares the slant ranges of the beams and determines the attitude of a vehicle with respect to a surface to which the beams are directed, the attitude being interpreted in terms of pitch and roll deviations of the vehicle; vertical range from the surface is also determined and, when a vertical reference is used, the average terrain slope can be measured; the signals representing the measurements can be used to stabilize or erect the vehicle.

---

The present invention relates to radar and specifically to verticality, altitude and velocity sensing radar.

Radar systems have been developed which use multiple beams in a fixed pattern and provide velocity and directional data, as in Doppler navigation equipment. Slant range is also measured along one or more beams, as in terrain avoidance radar. However, when attitude data is required, with reference to terrain or local vertical, inertial reference or gyro means are used.

The primary object of this invention is to provide a radar system which will determine verticality or attitude of a vehicle relative to average local terrain or surface, in addition to velocity data.

Another object of this invention is to provide such a radar system, which is independent of inertial or gyro means and which can even be used as a verticality reference source for inertial or gyro equipment used in other modes of operation.

Another object of this invention is to provide a radar system which will measure and use the pitch and roll angles (deviations from vertical) to continuously erect the vehicle to the local surface vertical.

A further object of this invention is to provide a radar to determine altitude or range along the vertical to the average local surface, in addition to direct range measurements along multiple beams.

A further object of this invention is to provide a radar to measure the average slope of the local terrain relative to the true gravity vertical when used in conjunction with an auxiliary vertical reference system such as a gyro or inertial platform.

The radar system and its operation are illustrated in the drawings, in which:

FIGURE 1 is a diagram of a vehicle in a particular attitude relative to a surface, illustrating the beam pattern and the various measurements used;

FIGURE 2 is a diagram of the signal modulation used, showing a negative Doppler return;

FIGURE 3 is a similar diagram showing a positive Doppler return;

FIGURE 4 is a block diagram of a frequency tracker used in the system; and

Figure 5:
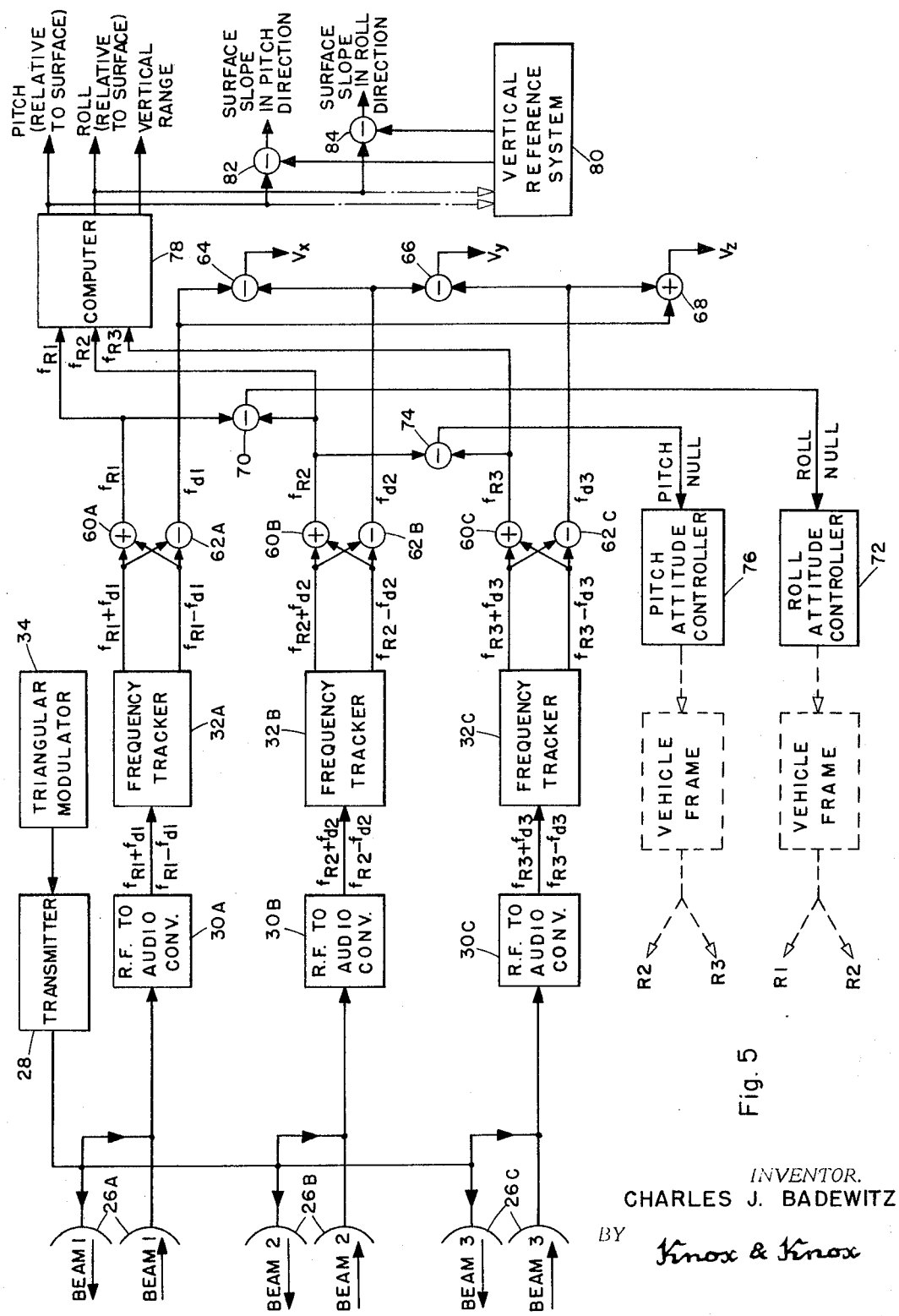
FIGURE 5 is a block diagram of the complete system.

In FIGURE 1, a typical vehicle 10 is shown in relation to a terrain surface on which the intended course 12 of the vehicle is marked. The vertical reference axis 14, corresponding to local vertical, and the orthogonal longitudinal axis 16 and lateral axis 18 are indicated with respect to the terrain and the intended course, the longitudinal axis being considered as parallel to the tangent to the terrain surface. The radar beam pattern has three beams, a left forward beam 1, a right forward beam 2 and a right rear beam 3, the arrangement being well known, each beam being at a known fixed angle with respect to vehicle vertical axis. When the vehicle is vertically aligned with local vertical, the beams would illuminate the terrain at spots marked 1A, 2A, and 3A, substantially symmetrical about the vertical and the intended course. However, for purposes of description, the vehicle is shown with a deviation from all three reference axes. Thus the vehicle longitudinal or pitch axis ($y$) is inclined upwardly at a positive pitch angle 20, the vehicle lateral or roll axis ($x$) is raised on the right side at a roll angle 22, and the vehicle vertical axis ($z$) is inclined to local vertical. The combination of pitch and roll, with corresponding velocities along those axes, cause the vehicle to deviate from the intended course by a drift angle 24. As a result the three beams are offset forward and to the right of their required positions when the vehicle is properly oriented.

The three radar beams may be transmitted simultaneously and continuously from individual antennas or a common antenna or may be transmitted sequentially by scanning, various techniques being well known. To simplify description the system illustrated in FIGURE 5 utilizes three separate antenna units 26A, 26B, and 26C for beams 1, 2 and 3.

The transmission from transmitter 28 is frequency modulated continuous wave, with the frequency modulation varying in a specific cyclic manner, as hereinafter described. The basic transmitter and receiver circuits can be of conventional types. Received signals from each antenna are fed into a converter 30, which mixes a portion of the transmitted signal with the received signal and thereby directly derives and passes the audio portion of interest to a frequency tracker 32. Converter 30 is a conventional R.F. to audio converter for the particular frequencies in use. The similar components in each signal channel are identified as A, B or C to correspond to the individual channel, the channel functions being identical to the point thus far described.

As illustrated graphically in FIGURE 2, the transmitted CW signal is frequency modulated to produce a frequency which increases linearly for an interval of time $\Delta T_1$, then decreases linearly to the original frequency over an equal interval of time $\Delta T_2$. This can be accomplished by a conventional triangular modulator 34.

The received signal has the same triangular modulation as the transmitted signal, but at a given instant is shifted in frequency due to the delay in time, $t_R$, in travelling from the vehicle to the terrain and back. Time $t_R$ proportional to the slant range along the partciular beam axis. As a result of the time delay $t_R$ and the linear frequency modulation, the instantaneous received frequency will differ from the instantaneous transmitted frequency by an amount $f_R$ representing the range. The received signal may also be shifted in frequency by an amount $f_d$, due to the Doppler effect caused by a component of velocity of the vehicle along the beam axis. FIGURE 2 indicates a negative Doppler condition (opening velocity), as from beam 3 which trails the vehicle, while FIGURE 3 indicates a positive Doppler (closing velocity), as from one of the leading beam 1 or 2.

Thus, during the time $\Delta T_1$, the received frequency differs from the transmitted frequency by a quantity $f_R - f_d$, while during the $\Delta T_2$ time period the difference is $f_R + f_d$. The difference between the received and transmitted signals thus provides range and velocity components for each individual beam.

To obtain consistent results identical linear frequency modulation is is necessary during the upsweep and downsweep. During the times of reversal of frequency modulation, at the peaks of the triangular modulation, the difference in frequency between the received and transmitted signals is not used. In actual practice, this time $t_R$ is so short with respect to the upsweep and downsweep times of the frequency modulation that the circuit can be blanked out during this time.

The frequency tracker 32 incorporates an error detector circuit comprising a single sideband modulator 36, an I.F. amplifier 38, a mixer 40, a low pass filter 42 and a discriminator 44 in series in that order. The output of discriminator 44 is applied through a two-way switch 46 to each of a pair of integrators 48 and 50 which feed a pair of variable frequency oscillators 52 and 54, respectively. Outputs from the oscillators 52 and 54 are fed back through a two-way switch 56 to the single sideband modulator 36. Switches 46 and 56 are synchronously actuated by a command switch 58 driven by the triangular modulator 34, to switch from one oscillator to the other as the linear frequency modulation reverses. Command switch 58 also provides a blank signal to the I.F. amplifier 38 at each frequency modulation reversal to blank out the circuit during the overlap period $t_R$ mentioned above. A carrier frequency $f_c$ is added at the mixer 40 to provide a reference frequency about which the frequency tracker can operate, the principle being well known.

In operation the frequency tracking loop causes each variable frequency oscillator to be driven at a frequency (plus $f_c$) corresponding to that of the input at the time that the particular oscillator is active in the loop. The input signal to the single sideband modulator 36 consists of a signal alternating between range frequency minus the Doppler on the upsweep of the triangular modulation, and range frequency plus the Doppler on the downsweep. The error detecting circuit provides the alternating error signals of the upsweep and downsweep portions of the modulation and these are passed by switch 46 to the integrators and then to the oscillators. Oscillator 52 is thus tuned to the range frequency minus Doppler (plus $f_c$) and oscillator 54 to the range frequency plus Doppler (plus $f_c$). The oscillator outputs are fed back to the modulator 36 to complete the loop and, by switch 56, are compared with the corresponding input signals to provide the error signals in the loop. The use of the triangular modulation with the time shared frequency tracker permits precisely equal treatment of both portions of a complete signal cycle.

Referring to FIGURE 5, the frequency tracker outputs of range frequency minus Doppler and range frequency plus Doppler are fed to a summing mixer 60 to provide the range frequency by itself, and to a difference mixer 62 to provide the Doppler frequency by itself. In FIGURE 5, these signals are designated by the subscripts 1, 2 and 3 to correspond to the three beams and clarify identification of signals in the subsequent stages of the system.

From the now separated range signals and velocity (Doppler) signals derived from the three beams, it is a simple matter to obtain: (1) the velocities along the three orthogonal axes $x$, $y$ and $z$ of the vehicle; (2) pitch and roll angles and correction signals to erect the vehicle to local vertical; (3) heading or drift angle; and (4) vertical range or altitude of the vehicle from the surface.

Doppler signals $f_{d1}$ and $f_{d2}$ from laterally separated beams 1 and 2 are applied to a difference mixer 64 and provide an output representing the relative velocity $V_x$ along the vehicle lateral axis $x$. This output can be applied in any well known manner, by servos, directional controls, or the like, to correct the lateral deviation or drift of the vehicle.

Doppler signals $f_{d2}$ and $f_{d3}$, from longitudinally separated beams 2 and 3, are applied to a difference mixer 66 to provide an output signal $V_y$ representing the velocity of the vehicle along the longitudinal or $y$ axis. For instrumental purposes the ratio of velocities $V_x$ and $V_y$ is the tangent of the drift angle. Doppler signals $f_{d1}$ and $f_{d3}$, from diagonally separated beams 1 and 3 are summed in a mixer 68 to provide an output signal $V_z$ representing the vertical velocity of the vehicle along the $z$ axis. These techniques are well known.

The range signals $f_{R1}$ and $f_{R2}$ are applied to a difference mixer 70, the result being the difference in ranges between the two laterally separated beams 1 and 2, which represents a roll deviation of the vehicle. This signal can be applied directly to operate a roll attitude controller 72 to null the vehicle roll. The broken line representation of the vehicle frame indicates the effect of roll correction moving the pertinent radar beams until the range difference is zero and the output of mixer 70 is reduced to zero.

Range signals $f_{R2}$ and $f_{R3}$ are similarly applied to a difference mixer 74, which has an output corresponding to a pitch deviation of the vehicle and can be used to operate a pitch attitude controller 76. Various attitude control means can be used, such as reaction jets, inertial means, or other systems which have been developed for the purpose.

In addition to providing direct signals for correction or roll and pitch, the three beam range signals can be fed to a computer 78 which will compute the actual roll and pitch angles relative to the average terrain. Thus the divergence of the vehicle from the local vertical is determined. It is also a simple matter to compute the true vertical range or altitude of the vehicle above the surface. Several simple digital computers now available are capable of handling the computations. A particular example is the Libratac 2000, General Purpose Airborn Digital Computer.

The required calculation is as follows:

FIGURE 1 illustrates the beams fixed in the vehicle body axes, the body axes, the local vertical, and pitch and roll angles. The centerline of the beam group is parallel to the vehicle vertical. For clarity, pitch and roll are defined as follows: the pitch angle is always measured in the plane formed by the spacecraft longitudinal axis and the local vertical. It is the angle between the longitudinal ($y$) axis and the horizontal. The roll angle is always measured in a plane perpendicular to the longitudinal axis and is the angle between the $x$ axis and the horizontal.

Let:

$i = 1, 2, 3$, or V to indicate beams 1, 2, 3 or vertical, then:
$R_i$ = Range along beams 1, 2, or 3
$R_v$ = Range along vertical
$\theta_i$ = Angle between $R_v$ and $R_1$, $R_2$ or $R_3$
$\alpha_i$ = Angle between X axis and beams 1, 2, 3 or vertical
$\beta_i$ = Angle between Y axis and beams 1, 2, 3 or vertical
$\gamma_i$ = Angle between Z axis and beams 1, 2, 3 or vertical Since $\cos \theta_i$ = sum of the product of the corresponding direction cosines of the two lines, $$\cos \theta_i = \cos \alpha_v \cos \alpha_i + \cos \beta_v \cos \beta_i + \cos \gamma_v \cos \gamma_i \quad (A-1)$$

but:

$$\frac{R_v}{R_i} = \cos \theta_i$$

and $$\cos \alpha_i = \frac{X_i}{R_i}$$

So Equation A-1 may be rewritten as:

$$R_v = X_1 \cos \alpha_v + y_1 \cos \beta_v + Z_1 \cos \gamma_v \quad (A-2)$$

which will yeild three simultaneous equations $$1 = \frac{X_1}{R_v} \cos \alpha_v + \frac{Y_1}{R_v} \cos \beta_v + \frac{Z_1}{R_v} \cos \gamma_v \quad (A-3)$$

$$1 = \frac{X_2}{R_v} \cos \alpha_v + \frac{Y_2}{R_v} \cos \beta_v + \frac{Z_2}{R_v} \cos \gamma_v \quad (A-3)$$

$$1 = \frac{X_3}{R_v} \cos \alpha_v + \frac{Y_3}{R_v} \cos \beta_v + \frac{Z_3}{R_v} \cos \gamma_v \quad (A-3)$$

which are solved for the direction cosines of the vertical range, i.e.:

$$\cos \alpha_v = \frac{X_v}{R_v} = R_v \frac{\begin{vmatrix} 1 Y_1 Z_1 \\ 1 Y_2 Z_2 \\ 1 Y_3 Z_3 \end{vmatrix}}{\begin{vmatrix} X_1 Y_1 Z_1 \\ X_2 Y_2 Z_2 \\ X_3 Y_3 Z_3 \end{vmatrix}} = R_v[A^*] \quad (A-4)$$

$$\cos \beta_v = \frac{Y_v}{R_v} = R_v \frac{\begin{vmatrix} X_1 1 Z_1 \\ X_2 1 Z_2 \\ X_3 1 Z_3 \end{vmatrix}}{\begin{vmatrix} X_1 Y_1 Z_1 \\ X_2 Y_2 Z_2 \\ X_3 Y_3 Z_3 \end{vmatrix}} = R_v[B^*] \quad (A-5)$$

$$\cos \gamma_v = \frac{Z_v}{R_v} = R_v \frac{\begin{vmatrix} X_1 Y_1 1 \\ X_2 Y_2 1 \\ X_3 Y_3 1 \end{vmatrix}}{\begin{vmatrix} X_1 Y_1 Z_1 \\ X_2 Y_2 Z_2 \\ X_3 Y_3 Z_3 \end{vmatrix}} = R_v[C^*] \quad (A-6)$$

however, $$\cos^2 \alpha_v + \cos^2 \beta_v + \cos^2 \gamma_v = 1 \quad (A-7)$$

or $$R_v^2[A^{*2}] + R_v^2[B^{*2}] + R_v^2[C^{*2}] = 1 \quad (A-8)$$

$$R_v = \frac{1}{\sqrt{A^{*2} + B^{*2} + C^{*2}}} \quad (A-9)$$

and, $$\cos \alpha_v = \frac{A}{\sqrt{A^{*2} + B^{*2} + C^{*2}}} \quad (A-10)$$

$$\cos \beta_v = \frac{B}{\sqrt{A^{*2} + B^{*2} + C^{*2}}} \quad (A-11)$$

$$\cos \gamma_v = \frac{C}{\sqrt{A^{*2} + B^{*2} + C^{*2}}} \quad (A-12)$$

From Equation A-1, $$\text{Pitch} = \beta_v - \frac{\pi}{2} \quad (A-13)$$

$$\text{Roll} = \cos^{-1} \frac{\cos \gamma_v}{\cos \text{pitch}} \quad (A-14)$$

With the simple three beam system it is thus possible to determined direction and velocity, altitude and attitude with respect to say terrain surface. The system itself does not require gyros or an inertial platform but, if such apparatus is used in the vehicle for other purposes, the attitude data derived from the system can be used as a vertical reference for the stable apparatus during operation over level terrain.

Appropriate smoothing may be incorporated into the beam range determination circuitry in a conventional manner to damp out fluctuations due to short term variations caused by terrain irregularities.

For flights over surfaces which are not flat, a vertical reference system 80, such as an inertial or gyro platform, may be used in conjunction with the radar to provide determination of terrain slope relative to true vertical. The pitch and roll outputs of the vertical reference system 80 are subtracted, in mixers 82 and 84, respectively, from the radar determined pitch and roll signals from computer 78. The resultant outputs represent the average terrain slope with respect to the pitch and roll axes of the vehicle.

If the vertical reference system 80 is not stabilized to vertical, as after tumbling, or when approaching a surface where local vertical is not known, the radar derived pitch and roll signals which define terrain vertical may be used to erect the vertical reference system with respect to terrain vertical. This is indicated in FIGURE 5 by the broken line connections from the computer pitch and roll outputs to the vertical reference system. The complete system is thus adaptable to a variety of flight and terrain conditions.

It is understood that minor variation from the form of the invention disclosed herein may be made without departure from the spirit and scope of the invention, and that the specification and drawings are to be considered as merely illustrative rather than limiting.

I claim:
1. A vertically, altitude and velocity sensing radar system for use in a vehicle travelling above a terrain surface, comprising:
   transmitter means having an output signal;
   means for directing the output of said transmitter toward the terrain surface in a plurality of beams divergent from the vertical axis of the vehicle;
   means for modulating the transmitter output signal with a cyclic linearly variable frequency modulation;
   receiving means to receive the reflected signal of each beam, compare the received signal with the transmitted signal of the respective beam and determine the difference in frequencies thereof with respect to time, representing range along the beam, and with respect to Doppler shift, representing velocity along the beam;
   means to compare the ranges measured along the various beams and determine therefrom the attitude of the vehicle relative to terrain vertical.
2. The system according to claim 1 and including means to compare the ranges measured along the various beams with the attitude of the vehicle and determine therefrom the range with respect to terrain vertical.
3. The system according to claim 1, wherein said last mentioned means includes means to determine the attitude of the vehicle in terms of pitch and roll deviations with respect to terrain vertical and provide error signals corresponding to the pitch and roll deviations;
   and vehicle erecting means responsive to said error signals for erecting the vehicle with respect to terrain vertical.
4. The system according to claim 1, and including a vertical reference in the vehicle;
   said last mentioned means including means to determine the attitude of the vehicle in terms of ptich and roll deviations with respect to terrain vertical;
   and means to compare the pitch and roll deviations with respect to the vertical reference, and thereby determine the slope of the terrain relative to the pitch and roll axes of the vehicle.

5. The system according to claim 1, and including a vertical reference in the vehicle;
said last mentioned means including means to determine the attitude of the vehicle in terms of pitch and roll deviations with respect to terrain vertical and provide error signals corresponding to the deviations;
and means responsive to said error signals to erect said vertical reference relative to terrain vertical.

References Cited

UNITED STATES PATENTS

| | | | |
|---|---|---|---|
| 2,256,539 | 9/1941 | Alford | 343—14 |
| 2,638,586 | 5/1953 | Guanella | 343—14 X |
| 2,914,763 | 11/1959 | Greenwood et al. | 343—9 |
| 3,184,736 | 5/1965 | Badewitz | 343—8 X |

RICHARD A. FARLEY, *Primary Examiner.*

RODNEY D. BENNETT, *Examiner.*

C. L. WHITHAN, *Assistant Examiner.*